INVENTOR.
L. Glenn Hogsten
BY
Bryce Beecher
ATTORNEY

June 11, 1963 L. G. HOGSTEN 3,093,389
STEERING GEAR ARRANGEMENT
Filed March 1, 1961 2 Sheets-Sheet 2
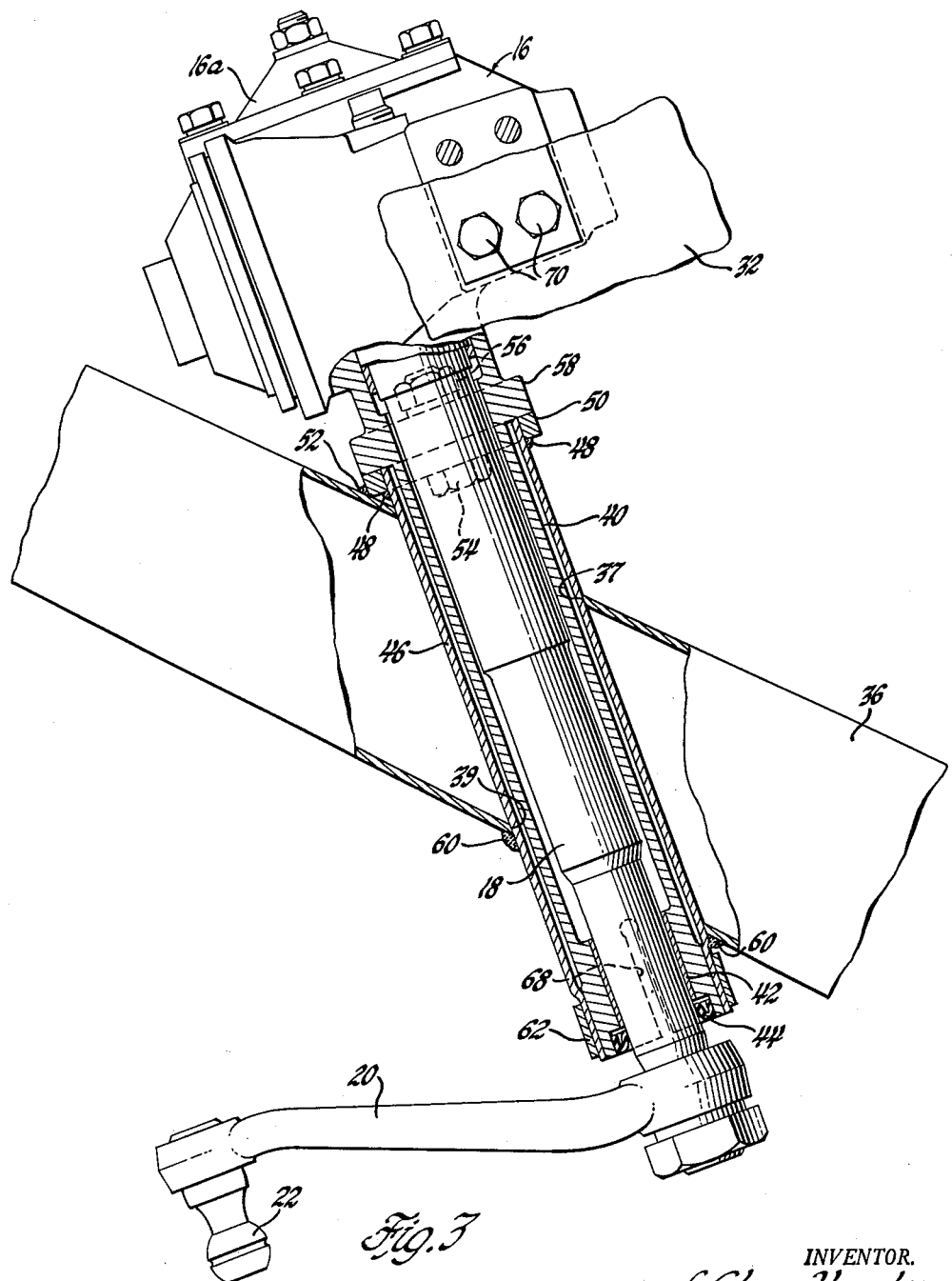
INVENTOR.
L. Glenn Hogsten
BY
Bryce Beecher
ATTORNEY United States Patent Office 3,093,389
Patented June 11, 1963

3,093,389
STEERING GEAR ARRANGEMENT
Leslie Glenn Hogsten, Birmingham, Mich., assignor to General Motors Corporation, Detroit, Mich., a corporation of Delaware
Filed Mar. 1, 1961, Ser. No. 92,518
2 Claims. (Cl. 280—87)

This invention relates to steering gears and more particularly pertains to a scheme for mounting a steering gear in a vehicle.

It is common to fixedly support a steering gear in a vehicle by means of a bracket made fast to the housing of the steering gear and bolted or welded to the vehicle frame at the operator's side of the vehicle. As so supported the steering gear is disposed inwardly of the frame side rail and thus occupies a portion of the engine compartment.

Due to the growing number of accessory devices which of necessity involve components located in the engine compartment, and due further to styling innovations tending toward reduction in the over-all size of the engine compartment, automotive engineers are increasingly confronted with clearance problems in this area. Accordingly, any development enabling the transfer of an assembly or part from the engine compartment to another location is highly desirable.

The present invention has as its principal object to provide a steering gear mount which in effect operates to remove the steering gear from the engine compartment.

A further object of the invention is to provide a steering gear mount meeting the aforesaid object which does not require any substantial modification either of the steering gear or of any of the other parts comprised in the steering train, i.e., the steering shaft and column, the steering linkage components, etc.

Still other objects and features of the invention will be apparent from the following description going to a preferred embodiment thereof. The description will proceed with reference to the accompanying drawings wherein:

FIGURE 3 is an enlarged elevation, partly in section, showing the steering gear and the parts immediately associated therewith.

Figure 2:
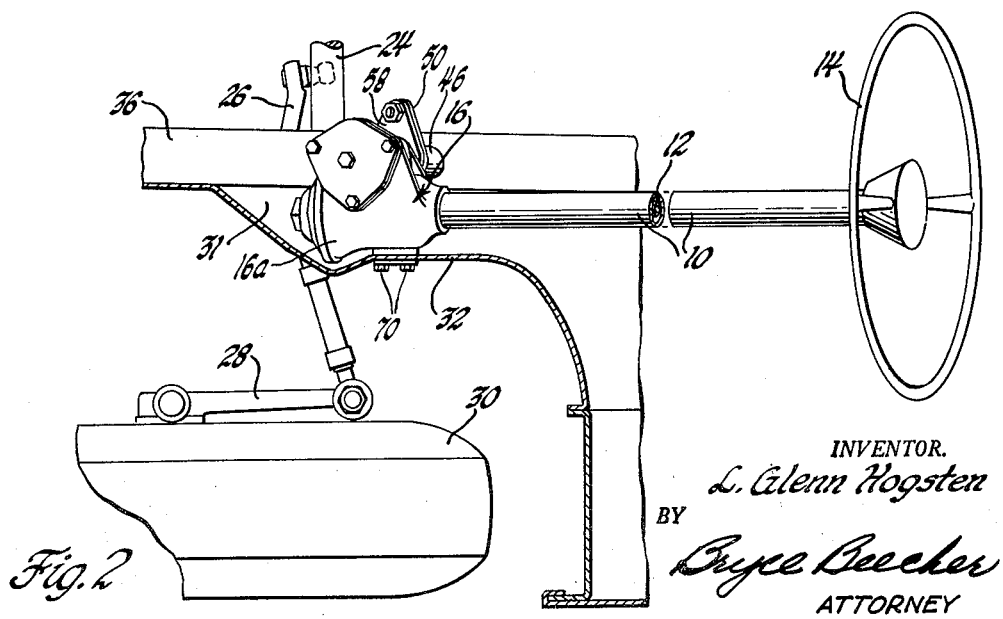
FIGURE 2 is a fragmentary plan view.

Referring to the drawings, the numeral 10 denotes a steering column enclosing a steering shaft 12 carrying a steering wheel 14 at its upper end. Shaft 12 terminates within a gear box 16 housing reduction gearing outputting to a pitman arm shaft 18 (FIG. 3). A pitman arm 20 suitably connected to the shaft 18 terminates in a ball stud 22 adapting it for pivotal connection to a steering linkage member 24. Such member is similarly linked to a tie rod 26 (FIG. 2) which is operably connected to the dirigible wheel 30 through a steering knuckle arm 28.

Tie rod 26 is disposed under a well or recess 31 of the fender 32. Recess 31 houses the steering gear housing 16a. Fender 32 is secured as by welding to the corresponding frame side rail 36.

To accommodate the elongated portion or extension 40 of the steering gear housing 16a, rail 36 which is of the box type (FIG. 3) has therein holes 37 and 39. The housing portion 40 at its lower end locates and supports a bushing 42 for the pitman arm shaft 18. A seal 44 seals the lower end of extension 40 and cooperates with the extension 40 in providing a lubricant receiving chamber within the extension for receiving lubricant for the shaft 18.

Surrounding the housing portion 40 is a tubular sleeve 46 slotted (68) at its lower end and having as its purpose to make up or compensate for the weakening of the frame side rail 36 occasioned by the presence of the two holes 37 and 39. At its upper end this tube is welded (48) to a ring element 50 which in turn is welded (52) to the rail 36. Bolts 54 carrying nuts 56 extend through holes in the ring element 50 and in the boss portion 58 of the housing 16a to secure such element to the housing.

Figure 1:
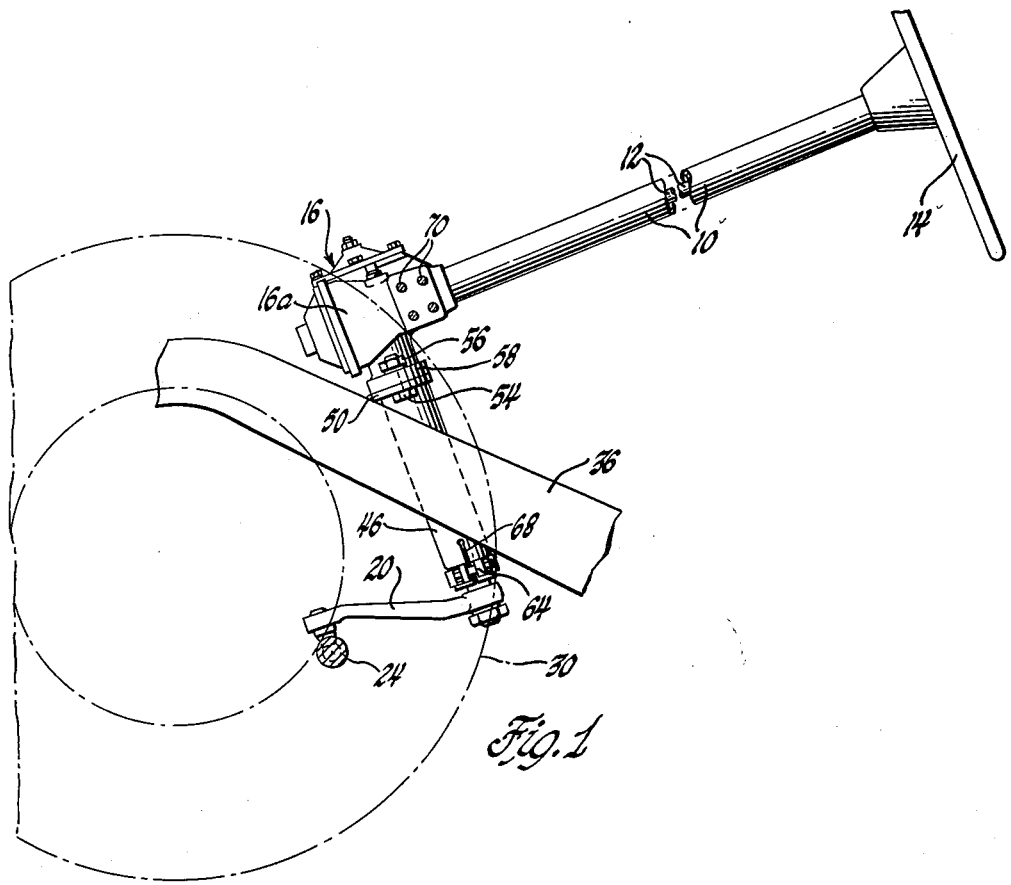
FIGURE 1 is a view in elevation illustrating the general disposition of a steering gear as installed in a vehicle in the manner of the invention, certain environmental parts being illustrated diagrammatically or shown broken away.

Tube 46 will be seen as directly welded to the bottom portion of the frame side rail at 60 and as carrying a strap 62 whereby the tube at its lower end is made tight about the elongated portion 40 of the steering gear housing. The tightening means 64 for the strap 62 will be seen in FIG. 1.

To stabilize the fixed connection between the steering gear and the frame side rail 36 the steering gear housing is provided with threaded holes for the accommodation of bolts 70 serving to fasten the steering gear to the fender 32. The additional support thus lent the gear precludes excessive vibration thereof.

It is to be understood that the invention is not limited to the precise construction shown in the drawings and described by the specification since it is capable of substantial modification within the limits of the following claims.

I claim:

1. The combination comprising, a vehicle body having an apertured frame side rail member and a fender having a portion disposed outwardly of said member in spaced relationship thereto and defining a steering gear housing recess, a steering gear housing located within said recess and including an elongated extension extending through said apertured side rail member, a pitman arm shaft depending from said steering gear housing and being rotatably supported within said extension, means sealing the lower end of said extension and cooperating therewith to provide a lubricant receiving chamber adapted to receive lubricant for said pitman arm shaft, a tubular member surrounding said extension and extending through and being secured to said side rail member, releasable means at the upper end of said tubular member and said extension for releasably securing said extension to said tubular member, releasable means at the lower end of said tubular member for releasably securing the lower end of said extension to said tubular member, and means releasably securing said housing to said fender portion, each of said releasable securing means being releasable to permit removal of said housing and said extension, including said chamber, as a unit with respect to said side rail member and said fender.

2. The combination comprising, a vehicle body having an apertured frame side rail member and a fender having a portion disposed outwardly of said member in spaced relationship thereto and defining a steering gear housing recess, a steering gear housing located within said recess and including an extension having a first depending portion and a second portion of reduced size depending from said first portion and joined thereto by flange means, said second extension portion extending through said apertured side rail member, a pitman arm shaft depending from said steering gear housing and being rotatably supported within said second extension portion, means sealing the lower end of said second extension portion and cooperating therewith to provide a lubricant receiving chamber adapted to receive lubricant for said pitman arm shaft, a tubular member surrounding said second extension portion and extending through and being secured to said side rail member, flange means at the upper end of said tubular member engageable by said extension flange means to locate said second extension portion within said tubular member, releasable means releasably securing said flange means to each other, releasable means at the lower end of said tubular member for releasably securing said second extension portion to said tubular member, and means releasably securing said housing to said fender portion, each of said releasable securing means being releasable to permit removal of said housing and said extension, including said chamber, as a unit with respect to said side rail member and said fender.

References Cited in the file of this patent

UNITED STATES PATENTS

| | | |
|---|---|---|
| 1,538,497 | Anibal | May 19, 1925 |
| 2,662,794 | Lindsay | Dec. 15, 1953 |
| 2,972,261 | White | Feb. 21, 1961 |

FOREIGN PATENTS

| | | |
|---|---|---|
| 869,529 | France | Nov. 7, 1941 |